United States Patent [19]

Junghänel

[11] 4,335,607
[45] Jun. 22, 1982

[54] APPARATUS FOR MEASURING THE FILLING LEVEL OF CONTAINERS

[75] Inventor: Arnold Junghänel, Alfeld, Fed. Rep. of Germany

[73] Assignee: Alfelder Eisenwerke Carl Heise Kom. Ges., Alfeld, Fed. Rep. of Germany

[21] Appl. No.: 114,888

[22] Filed: Jan. 24, 1980

[30] Foreign Application Priority Data

Feb. 2, 1979 [DE] Fed. Rep. of Germany ....... 2903906

[51] Int. Cl.³ ............................................. G01F 23/20
[52] U.S. Cl. ................................................. 73/290 R
[58] Field of Search ..................... 73/321, 296, 290 B, 73/290 R

[56] References Cited

U.S. PATENT DOCUMENTS 4,043,199 8/1977 Greer ................................. 73/290 R

FOREIGN PATENT DOCUMENTS 7807121 6/1978 Fed. Rep. of Germany .
2833414 3/1979 Fed. Rep. of Germany ........ 73/296
53211 4/1967 Poland ............................... 73/290 R
438881 5/1978 U.S.S.R. ............................... 73/296
628407 10/1978 U.S.S.R. ............................... 73/296

OTHER PUBLICATIONS

Catalogue of Central Scientific Co., CENCO, p. 25.

*Primary Examiner*—Charles A. Ruehl
*Assistant Examiner*—Denis E. Corr
*Attorney, Agent, or Firm*—Max Fogiel

[57] ABSTRACT

An apparatus for measuring the filling level of silos and similar containers has a measuring chain which depends from a cylinder and piston unit serving to raise and lower it; the chain extends through the upper opening of the container to the bottom wall of the same. A measuring device is connected in series with the arrangement mounting the chain and with the chain itself, and has a spring which is extensible and contractable in a path parallel to the series formed by the chain, the mounting arrangement for the same and the measuring device, and an indicator movable parallel to the spring path.

8 Claims, 1 Drawing Figure

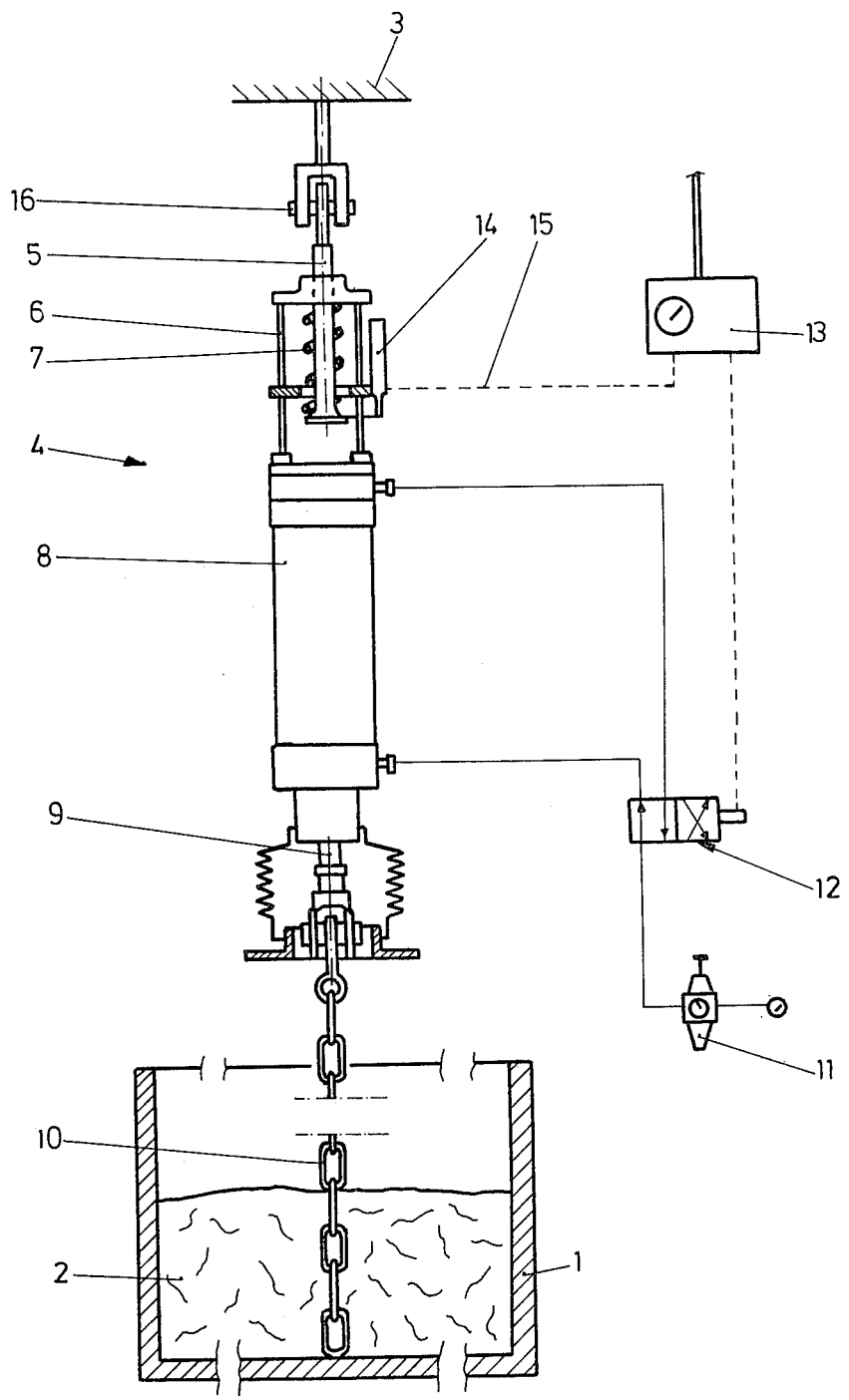

APPARATUS FOR MEASURING THE FILLING LEVEL OF CONTAINERS

BACKGROUND OF THE INVENTION

The present invention relates to an apparatus for measuring the filling level of silos and other containers.

More particularly, the invention relates to an apparatus of the type mentioned above, which is especially suitable for continuous or discontinuous measuring of the filling level of silos and analogous containers for heavy goods, for example minerals used in the making of bituminous for road-construction purposes.

Apparatus of the general type here in question is already known. For instance, U.S. Pat. No. 4,043,199 discloses such an apparatus which has a vertically oriented electromagnetically actuated device for raising and lowering a measuring chain which depends from it into the interior of a container. The measuring chain passes through a cut-out spring and extends down to the bottom wall of the container. It is protected by a stationarily mounted hose which surrounds it. At the level of the spring the measuring chain carries a coupling device which, when actuated and when the lifting device is operated, permits a user to load the spring with the weight of that portion of the measuring chain which is hanging freely, i.e. which is not immersed in the contents of the container. In this manner the spring can be subjected to different spring tensions which constitute a measure for the level to which the container is filled with material. The spring, which bends under the influence of the chain weight extends transversely to the vertical elongation of the chain and, due to the electromagnetic construction of the lifting device, the latter also extends essentially transversely to the elongation of the chain, so that all in all this prior-art arrangement is relatively wide in its structural dimensions.

Another device for the purposes described above is disclosed in German Petty Patent GM 7,807,121. In this reference a frame is provided in the upper region of a silo and a measuring bridge is suspended from this frame via two springs. Parallel to this measuring bridge a lifting cylinder is connected to the frame and the measuring chain is movably and removably secured to the lifting cylinder. Parallel to the spring elongation and contraction path, there is provided a measuring device. A coupling arrangement is provided between the measuring chain and the measuring bridge so that in response to actuation of the lifting cylinder the weight of the free-hanging measuring chain can be disengaged from the lifting cylinder and shifted to the measuring bridge, with the result that the measuring device performs movement under the influence of this weight which indicate the filling level in the silo. Here, also, the lifting cylinder and the measuring bridge are connected in parallel with one another so that the device must necessarily be relatively wide in its structural dimensions.

In addition to the problems mentioned above, the prior-art devices of this type have the further disadvantage that the springs of the respective measuring bridge must always be fully loaded and subsequently fully unloaded, i.e. the spring or springs will always be stretched respectively moved through a rather large spring path in dependence upon the measured filling level in the silo. Moreover, there are applications in which a rather wide structural dimension of such a device is disadvantageous, because the region at the upper end or at the cover of the silo or container is often almost completely needed for the supply of the material into the container.

SUMMARY OF THE INVENTION

It is an object of the present invention to overcome the disadvantages of the prior art.

A more particular object of the invention is to provide an improved apparatus for measuring the filling level of silos and other containers, which is not possessed of the aforementioned disadvantages.

A still further object of the invention is to provide such an apparatus which is of relatively narrow construction and thus requires rather little space as seen in transverse direction of the respective container, leaving a very large proportion of the upper end of the container open and available for the introduction of material.

Still another object of the invention is to provide an apparatus of the type in question which in its structure and function more closely takes account of the requirements of the particular applications.

In keeping with these objects, and with others which will become apparent hereafter, one aspect of the invention resides in an apparatus for measuring the filling level of silos and analogous containers having an upper opening and a bottom wall. Briefly stated, such an apparatus may include a measuring chain having a length at least equal to the distance between the opening and the bottom wall, means mounting the chain to depend on the graviational force from above into a container and to extend to the bottom wall thereof, such means being operative to raise and lower the chain relative to the container, and a measuring device connected in series with the mounting means and the chain and having spring means extensible and contractable in a path which is in series with the chain mounting means and device, and an indicator movable parallel to the aforementioned path.

In other words, the present invention departs from the heretofor accepted parallel arrangement of the components of the apparatus and provides a series arrangement, i.e. arranges the individual components of the apparatus in line one behind the other, respectively, one above the other. The overall structural dimension of the apparatus in horizontal (i.e. transverse) direction is thus limited to the diameter of the lifting cylinder and far extending horizontal measuring bridges or devices are unnecessary. Quite surprisingly the invention has the further and unexpected advantage that the spring of the measuring device is not totally unloaded even during the periods during which no measurements are being taken, so that the spring remains loaded at all times and the result that the forces acting upon it will fluctuate to a much smaller degree than in the devices according to the prior art in which the spring or springs are totally unloaded during the periods during which no measurements are being taken. This unexpected advantage substantially increases the useful life of the apparatus according to the present invention and is most advantageous in connection with the rough service requirements much of such apparatus, particularly where the apparatus are used for measuring the filling level of heavy goods in a container.

The measuring chain may be articulately but nondetachably secured to the lower end of the lifting cylinder, particularly to the piston rod of the same. A coupling device, as required in the prior art, is totally unnecessary in the apparatus according to the present invention.

The measuring device used in the apparatus according to the invention may be composed of two concentrically arranged parts which are movable axially with reference to one another, and one or more springs arranged concentrically with reference to these two parts and connected to the same. Due to this construction the measuring device is much narrower in transverse direction than those of the prior art and can be readily accommodated in a space which is located within the maximum diameter of the lifting cylinder. Moreover, due to the coaxial arrangement of the spring or springs, the loading spring or springs is more advantageous than what is known from the prior art.

The entire apparatus may be secured to the container cover, a support or the like via a part of the measuring device. The measuring device may, of course, also be mounted above a cover of the container, in which case the cover must be provided with an appropriate cut-out or the like through which the measuring chain can extend. In any case, however, it is unnecessary (as required in the prior art) to provide several mounting points for the measuring device on the one hand and for the lifting cylinder on the other hand at the container cover, respectively, on a support.

BRIEF DESCRIPTION OF THE DRAWING

The single FIGURE illustrates an exemplary embodiment of the invention in a somewhat diagrammatic, partly sectioned side-elevational view.

DESCRIPTION OF A PREFERRED EMBODIMENT

Discussing now the drawing in detail it will be seen the reference numeral 1 identifies an only diagrammatically illustrated container which may be a silo or any other container having an open top through which material can be admitted (by e.g. pouring or the like) so as to form a filling 2 within the container 1 which can extend to various different levels therein. A support, such a carrier, beam or the like 3 is located above the container 1 and may be a part of the container cover or the like. Suspended from it is the apparatus 4 according to the present invention, i.e. an apparatus for measuring the filling level of the container 1. The apparatus has a measuring device 5, 6 composed of the two concentric but axially relatively shiftable parts 5 and 6 between which one or more springs 7 are concentrically mounted (one illustrated) to bear upon the two parts. Secured to the lower end of the part 6 is the cylinder and piston unit 8 which serves to raise and lower the measuring chain 10. The cylinder and piston unit 8 may be pneumatically or hydraulically operable and has a downwardly extending piston rod 9 to which the measuring chain 10 is articulately secured, but in such a manner that it is not removable. The measuring chain 10 extends to the bottom wall of the container 1 so that a part (the lower part) of the chain 10 is always embedded in the material 2 which has been admitted into the container 1.

The cylinder and piston unit 8, which is here seen to be of the hydraulic type, is supplied with compressed air in the diagrammatically illustrated manner. A non-illustrated source of compressed air supplies such air via a pressure reducer 11 to a switching valve 12 (a slide valve) the operation of which will be readily apparent inasmuch as it is shown as a symbol. The valve 12 is controlled in the illustrated embodiment by a timer 13 so that measurements are made at preselected intervals. Of course, the valve 12 could also be manually operated if desired.

An indicator 14 is arranged in parallel to the path of expansion and contraction of the spring 7, or to a part of this path, and the indicator 14 may be composed of an electrical or electronic unit such as are well known from the art. It yields a signal which is dependent upon the extent of expansion or contraction of the spring 7 and is a function of the level to which the container 1 is filled with material 2. This signal is supplied via line 15 and indicated visually on the illustrated gauge which may form a part of a structural unit including the timer 13. The part 5 of the measuring device 5, 6 may be mounted via the pivot joint 16 to the carrier 3.

A glance at the drawing indicates that the transverse dimensions of the apparatus according to the present invention are very small, in that the maximum transverse dimension is to all intents and purposes determined by the maximum transverse dimension of the cylinder and piston unit 8 since all other parts of the apparatus can be made small enough in their transverse dimensions to fit within the maximum transverse dimensions given by the cylinder and piston unit 8.

When the material 2 is admitted into the container 1 (e.g. by pouring from above), and also when it is withdrawn from the region of the bottom wall of the container through not illustrated outlets provided for this purpose, the level of material 2 in the container 1 changes constantly. In order to be able to measure this level, i.e. the upper level to which the material 2 fills the container 1, the lifting cylinder 8 is so operated that the piston rod 9 is upwardly retracted into the unit 8 whereby the chain 10 is raised to a certain extent. Subsequently the valve 12 is reversed enough so that the piston rod 9 is now extended outwardly and downwardly from the cylinder and piston unit 8. This causes one or more chain links of the free-hanging portion of the measuring chain 10 (i.e. the portion above the upper level of the material 2) to fold down and rest upon the upper level of the material 2; as a rule, the remainder of the measuring chain 10 remains embedded within the material 2. The weight component acting upon the measuring device 5, 6 is the weight of the free hanging part of the chain 10; the weight of the cylinder and piston unit 8 itself as well as of the part 6 of the measuring device 5, 6 can be readily compensated so that it will not be a factor to be taken into consideration in the indications obtained with the apparatus according to the invention.

Depending upon the weight of the free-hanging portion of the chain 10, the spring path of the spring (i.e. the degree of elongation or expansion of the spring 7) will change and this in turn influences the device 14 correspondingly so that a signal is issued by this device which is indicative of the upper filling level of the material 2 in the container 1.

This measurement may be repeated with any desired frequency, and it goes without saying that this may need not be at fixed intervals but could also be only if and when it is desired by e.g. an operator. A different type of control could also be used.

It will be realized from the above description that the spring 7 is never fully unloaded, which means that the extent of extension and contraction of the spring 7 (i.e. the spring path) will always be on the order of magnitude at which the spring is stressed only gently which means that the spring will have an extended life time because it is not subject to premature fatigue, even in the rough operating conditions encountered in silos or other containers for heavy materials, such as gravel or the like to be used in road construction and similar projects.

The invention has been described hereinabove with respect to an exemplary embodiment illustrated in the drawing. It will be understood, however, that this is for purposes of explanation only and that the actual extent of protection sought is determined exclusively by the appended claims.

What is claimed is:

1. Apparatus for measuring the filling level of silos and analogous containers having an upper opening and a bottom wall, comprising a measuring chain having a length at least equal to the distance between the opening and the bottom wall; means mounting said chain to depend under gravitational force from above into a container and to extend to said bottom wall, said means being controlably extensible and retractable and thus being operative to raise and lower the chain relative to the container; and a measuring device connected in series with said mounting means and said chain, said measuring device having spring means extensible and contractable in a path which is in series with said chain, and mounting means, and an indicator movable parallel to said path, the weight of the chain and said mounting means acting continuously on said spring means so that said spring means is always under load to increase the operating life of said spring means by preventing repeated loading and fully unloading of said spring means, and thereby reducing fatigue of said spring means.

2. Apparatus as defined in claim 1, said mounting means comprising an upright cylinder-and-piston unit.

3. Apparatus as defined in claim 2, said chain being articulately connected to a lower end of said unit.

4. Apparatus as defined in claim 2, said chain being articulately connected to a lower end of a piston rod of said unit.

5. Apparatus as defined in claim 2, said measuring device comprising two concentric members movable axially relative to one another along said path, and said spring means comprising at least one spring concentric with said members and connected to the same.

6. Apparatus as defined in claim 1, and further comprising means suspending said chain, and mounting means from a support.

7. Apparatus as defined in claim 6, said suspending means including a part of said device.

8. Apparatus as defined in claim 1, wherein said mounting means comprises an upright cylinder-and-piston unit; said chain being articulately connected to a lower end of said unit; said measuring device comprising two concentric members movable axially relative to one another along said path, said spring means comprising at least one spring concentric with said members and connected to the same; means suspending said chain, mounting means and device from a support, said suspending means including a part of said measuring device.

* * * * *